United States Patent [19]

Best et al.

[11] Patent Number: 5,223,012
[45] Date of Patent: Jun. 29, 1993

[54] FILTER CANDLE

[75] Inventors: Walter Best, Düren; Eberhard Janssen, Düren-Echtz, both of Fed. Rep. of Germany

[73] Assignee: Thomas Josef Heimbach GmbH & Co., Duren, Fed. Rep. of Germany

[21] Appl. No.: 698,102

[22] Filed: May 10, 1991

[30] Foreign Application Priority Data

May 26, 1990 [DE] Fed. Rep. of Germany ....... 4017071

[51] Int. Cl.⁵ ............................................ B01D 46/00
[52] U.S. Cl. ........................................ 55/523; 55/381
[58] Field of Search ............... 55/523, 341.1, 529, 55/522, 381, DIG. 30; 210/342, 496, 497.01

[56] References Cited

U.S. PATENT DOCUMENTS

| | | | |
|---|---|---|---|
| 2,220,772 | 11/1940 | Millard et al. | 4/291 |
| 2,521,107 | 9/1950 | Wiley | 55/523 |
| 2,863,562 | 12/1958 | Getzel | 280/496 |
| 3,334,748 | 8/1967 | Rozek | 210/132 |
| 3,349,919 | 10/1967 | Royer | 210/232 |
| 3,451,197 | 6/1969 | Ballard | 55/381 |
| 4,692,176 | 9/1987 | Israelson | 55/523 |
| 4,894,070 | 1/1990 | Keidel et al. | 55/523 |
| 4,979,969 | 12/1990 | Herding | 55/523 |

FOREIGN PATENT DOCUMENTS

| | | | |
|---|---|---|---|
| 87738 | 8/1959 | Denmark | 55/523 |
| 0010705 | 5/1980 | European Pat. Off. | |
| 3024324 | 1/1982 | Fed. Rep. of Germany | 55/523 |
| 119412 | 9/1980 | Japan | 55/523 |
| 584137 | 8/1984 | U.S.S.R. | |

*Primary Examiner*—Bernard Nozick
*Attorney, Agent, or Firm*—Joseph W. Berenato, III

[57] ABSTRACT

A filter candle, especially for gas equipment, includes a plurality of cooperatively associated tubular mutually telescopically engageable filter-candle segments. Each segment is comprised of an inherently dimensionally stable material. Each segment has structure for supporting each segment relative to the other segments, and additional structure for limiting the movement thereof relative to the associated segment. Structure is also provided for releaseably supporting the segments together as a filter candle.

37 Claims, 2 Drawing Sheets

FILTER CANDLE

The invention concerns a filter candle, in particular for gas filters, consisting of an inherently dimensionally stable, porous material, especially a sintered plastic and also of sintered ceramic or metal particles of all geometric cross-sections.

The expression filter candle denotes an elongated hollow body, as a rule of cylindrical or other geometric cross-sections, closed at one end and open at the other and of which the metal walls are made of an effective filter material. As a rule such filter candles are suspended by their open-ended side in filter equipment and most of the time the flow through them is from the outside to the inside, whereby the filtered-off particles deposit on the outside (see ULLMANNS ENZYKLOPAEDIE DER TECHNISCHEN CHEMIE, 4th ed., vol. 2, p. 177).

Such filter candles are used in temperature ranges up to hot-gas filtration. Sintered plastics and metals, however, also ceramics, are applicable, effective filtration materials. Such filter candles are inherently dimensionally stable, that is they are substantially rigid, and as a rule a change in shape entails destruction. Illustratively such a filter candle is disclosed in the German Gebrauchsmuster 87 09 095.3.

Heretofore such filter candles could be manufactured only up to certain sizes because they could hardly be handled otherwise, in particular as regards shipping and installation. When they are made of sintered material, they are very brittle as a rule and therefore susceptible to destruction. Furthermore, expensive sintering furnaces are required when making filter candles of great lengths.

Accordingly it is the object of the invention to make a filter candle which on one had is easily handled and on the other can be economically manufactured.

This problem is solved by the invention by the filter candle consisting of telescoping filter-candle segments. Thus the basic concept of the invention is to divide the filter candle into individual, mutually telescoping filter-candle segments. Per se such filter-candle segments are easily handled and therefore not susceptible to destruction. When they are sintered, they can be made in small sintering furnaces and in mass production. When installed in filtration equipment, the filter-candle segments when telescoped apart complement one another to form large filter candles and therefore they also can be used in filter equipment with high flow rates. If individual regions of the filter candle are damaged or clogged, the filter candle need not be exchanged as a whole, merely the particular filter-candle segment so affected. Moreover, the cross-section of the telescoped-apart filter candle tapers off in one direction. As a result, high gas speeds take place in this direction during purification, whereby this purification is improved.

In a development of the basic concept of the invention, the filter-candle segments when telescoped apart shall mutually support each other in geometrically locking manner. This design offers the advantage that the filter can be installed to be suspended without requiring additional support means. Where the support takes place over the entire periphery, mutual sealing of the filter-candle segments is thereby achieved.

In the simplest case, the mutual bracing in the telescoped-apart condition can be implemented by projections preferably shaped into the filter-candle segments. These projections preferably shall form inward flanges at the lower side and outward flanges at the upper side. The flanges may assume a number of cross-sections. Illustratively they may be U-shaped to result in a sort of labyrinth sealing. However the flanges also may merely project horizontally. In a deviation from such designs, the inward flanges also may be directed obliquely downward and the outward flanges obliquely upward, whereby improved sealing and automatic centering is assured. Lastly the inward flanges may be gutter-shaped and the outward ones may be bead-shaped as regards the cross-section of both.

However, a geometrically locking bracing of the filter-candle segments also may be achieved in that they are of such conical design that the lower diameter of the particular outer filter-candle segment shall be less than the upper diameter of the particular adjacent, inner filter-candle segment. In that event additional projections or flanges are unnecessary, i.e., these filter-candle segments can be manufactured in especially simple manner.

To achieve well-abutting bracing of the filter-candle segments, the lowermost should comprise an additional weight.

To improve the sealing of the individual filter-candle segments relative to each other, a further feature of the invention provides sealing rings by means of which the individual filter-candle segments abut when telescoped apart. The sealing rings may be made of the material matching the application.

In a further feature of the invention, the least-diameter filter-candle segment comprises a string means projecting inside beyond the filter-candle segment with the largest cross-section. Where this string means is in the form of a cable, such cable can be used to raise suspended filter-candle segments and thereby telescoping them together. If the string means is a rigid rod, then this rod can be raised and lowered for the same purpose. Such a rod also makes it possible to mount the filter candle standing up. To avert excessive stresses or pressures, the rod should be connected by a spring to the filter-candle segment.

Moreover the filter candle may be provided with a displacement means of which the lifting base can be made to rest against the bottom of the lowermost filter-candle segment and be moved upward. The lifting base at the same time may be designed to serve as a sieve-base so that the lowermost filter-candle segments of several filter candles suspended adjacent to one another can be lifted simultaneously. Appropriately the telescoping filter-candle segments are provided with external drive projections in the above cases.

The invention is elucidated by embodiment modes shown in the drawing, where all the Figures are in vertical section:

Figure 1:
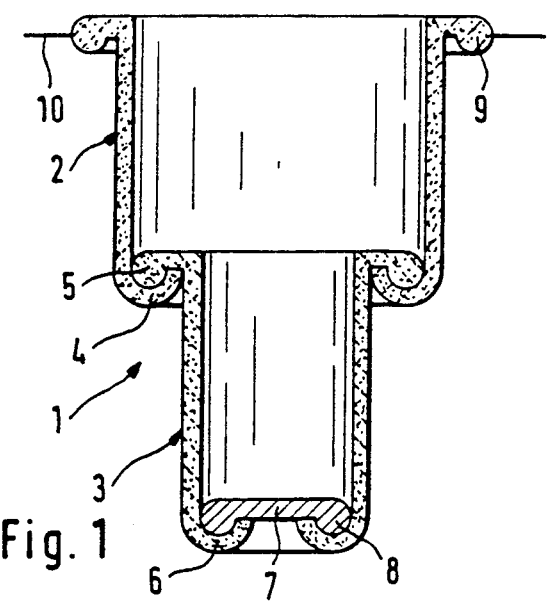
FIG. 1 is a filter candle with bead-shaped and groove-shaped flanges.

The filter candle 1 shown in FIG. 1 consists of two filter-candle segments 2,3 with cylindrical cross-sections. Both filter-candle segments 2, 3 telescope relative to each other. In the telescoped-apart condition being shown, the lower filter-candle segment 3 is suspended from the upper filter-candle segment 2.

Approximately the upper filter-candle segment 2 comprises an inner flange 4 at its lower rim in the form of a gutter and extending over the entire periphery. An external flange 5 shaped into the upper rim of the lower filter-candle segment 3 engages the inner flange 4 by its beaded rim. The cross-sections of the inner and outer flanges 4 and 5 so match each other that a large and sealing contact is achieved.

The lower filter-candle segment 3 also comprises a gutter-shaped inner flange 6 extending over the entire periphery. An end plate 7 engages this inner flange 6 by its matching, bead-shaped outer rim 8. The end plate 7 also may consist of a filter material. Preferably however it may be a heavy metal plate in order to keep the filter-candle segments 2, 3 in the shown and pulled-apart position.

An external flange 9 is shaped into the upper rim of the upper filter-candle segment 2 and also assumes the form of a beam. By means of this external flange 9, the filter-candle segment 2 rests on a partition 10 denoted merely by a line. This partition 10 separates the upper purified gas portion from the lower crude gas portion inside a sealed filter. Such a filter illustratively is described in the VDI guidelines 3677 on p. 16. The filter comprises a lower crude-gas intake and a purified gas discharge above the partition 10.

The filter-candle segments 2, 3 consist of a filtering material. Illustratively ceramics, but also porous, organic and sintered polymers such as polyethylene, polytetrafluoroethylene or polysulfones are applicable. Furthermore they may comprise suitable coatings for instance of SiC or polytetrafluoroethylene. The crude gas moves from the outside through the material of the filter-candle segments 2, 3 and then flows through the inner space enclosed by the filter candle 1 upward into the upper portion of the filter which it leaves through the purified gas discharge.

Figure 2:
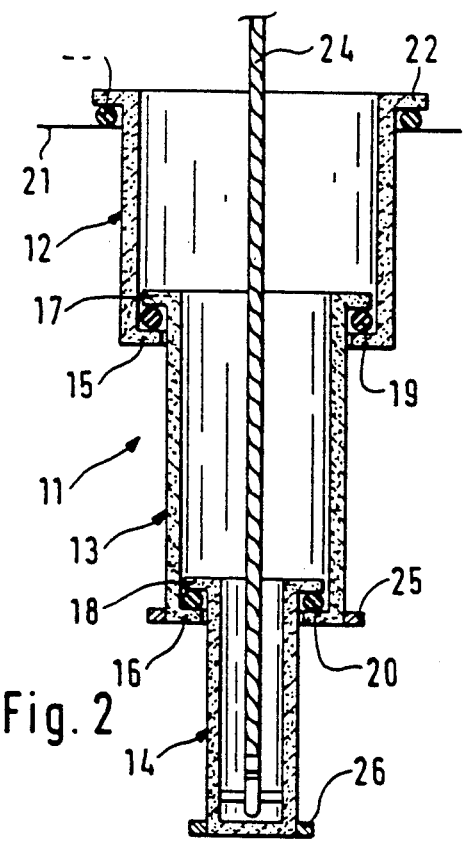
FIG. 2 is a filter candle with horizontal flanges.

FIG. 2 shows another embodiment of a filter candle 11. This filter candle 11 consists of three mutually telescoping filter-candle segments 12, 13, 14 made of a filtering material.

The upper and lower filter-candle segments 12 and 13 comprise at their lower side horizontally projecting inner flanges 15, 16. An external flange 17 projecting horizontally from the upper rim of the center filter-candle segment 13 rests on the internal flange 15 of the upper filter-candle segment 12 whereas a horizontal external flange 18 projecting from the upper rim of the lower filter-candle segment 14 rests on the inner flange 16 of the center filter-candle segment. Each support is implemented by sealing rings 19, 20 assuring sealing over the entire periphery. The filter-candle segments 12, 13, 14 otherwise evince a cylindrical cross-section of which the diameter decreases downward from segment to segment. The lower filter-candle segment 14 is closed at its bottom.

As in the embodiment of FIG. 1, the filter candle 11 is suspended from a partition 21 of a filter not shown here in further detail. For that purpose the upper filter-candle segment 12 comprises an integrated horizontally projecting external flange 22 resting on a sealing ring 23. The gas is moved in the same manner as in the embodiment already described in relation to FIG. 1, i.e., the crude gas passes from the outside through the filter-candle segments 12, 13, 14 into the inner space they enclose and then flows out upward.

The lower end of a cable 24 is affixed to the base region of the lower filter-candle segment 14. This cable allows telescoping the filter-candle segments 12, 13, 14 into one another and to pull them up and out of the filter. To assure that in the process the particular filter-candle segments 12, 13 are carried along, the middle and lower filter-candle segments 13, 14 comprise external drive rings 25, 26 that were mounted subsequently, for instance by bonding.

Figure 3:
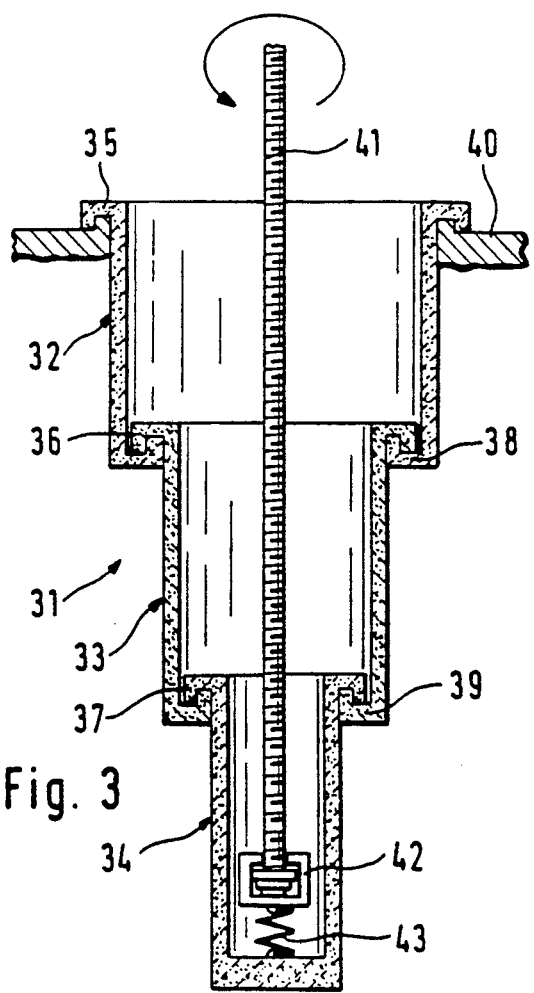
FIG. 3 is a filter candle with U-shaped flanges.

FIG. 3 shows a further filter candle 31 consisting also of three telescoping filter-candle segments 32, 33, 34 in the manner of the embodiment of FIG. 2. The filter-candle segments 32, 33, 34 are cylindrical in their cross-sections and differ from those of FIG. 2 only by the design of their flanges.

All filter-candle segments 32, 33, 34 comprise cross-sectionally U-shaped external flanges 35, 36, 37 at their upper rims. The external flanges 36, 37 of the middle and lower filter-candle segments 33, 34 are matched by cross-sectionally U-shaped inner flanges 38, 39 at the particular lower rims of the upper and middle filter-candle segments 32, 33, that is, each particular pair of external and inner flanges 36, 38 and 37, 39 engage in geometrically locking manner, and this over the entire periphery. Thereby the filter-candle segments 32, 33, 34 hang into each other.

The upper filter-candle segment 32 rests by the external flange 35 on a partition 40 of a filter not shown herein in further detail. The design of such a filter is discussed in relation to FIG. 1. The crude gas passes from the outside through the filter material composing the filter-candle-segments 32, 33, 34 into the inner space they enclose and then flows upward and out.

A threaded rod 41 extends vertically through the inner space of the filter-candle segments 32, 33, 34 and is suspended by its omitted end so it can be raised and lowered. Its lower end is connected by a thrust bearing 42 to a helical spring 43 affixed to the base of the lower filter-candle segment 34. When the threaded rod 41 is lowered, the helical spring 43 can be compressed and then function as a compression spring. In this manner areal compression between the external flanges 36, 37 and the inner flanges 38, 39 and between the external flange 35 and the partition 40 can be increased and thereby the sealing of these zones shall be improved. Furthermore, the filter-candle segments 32, 33, 34 are held in place in the shown telescoped-apart position.

The threaded rod 41 also is suitable to telescope together and pull up the filter-candle segments 32, 33, 34. However in this case, as in the embodiment of FIG. 2, drive rings omitted herefrom or the like must be present on the outsides of the filter-candle segments 33, 34.

Figure 4:
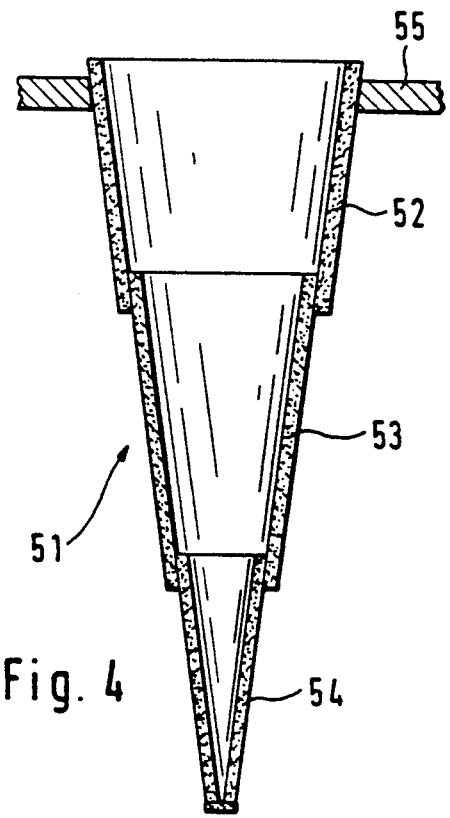
FIG. 4 is a filter candle with conical filter-candle segments.

FIG. 4 shows a further filter candle 51 consisting of three filter-candle segments 52, 53, 54 made of a porous and filtering material. The filter-candle segments 52, 53, 54 are conical and their diameters taper in the downward direction. The particular lower diameter of the upper filter-candle segments 52, 53 is less than the upper diameter of the particular filter-candle segment 53 and 54 resp. adjoining below, whereby the individual filter-candle segments 52, 53, 54 do overlap but cannot slip out downward. Because the conical angle of all the filter-candle segments 52, 53, 54 is equal, they make contact with each other over a surface in the zone of overlap.

The upper filter-candle segment 52 is suspended from a matching conical aperture in a partition 55 which is part of a filter, now shown herein in further detail, of the above described kind. The conical aperture in the partition 55 again is such that the upper filter-candle segment 52 cannot slip out downward. The crude gas moves from the outside into the inner space subtended by the filter candle 51 and then flows out upward.

Figure 5:
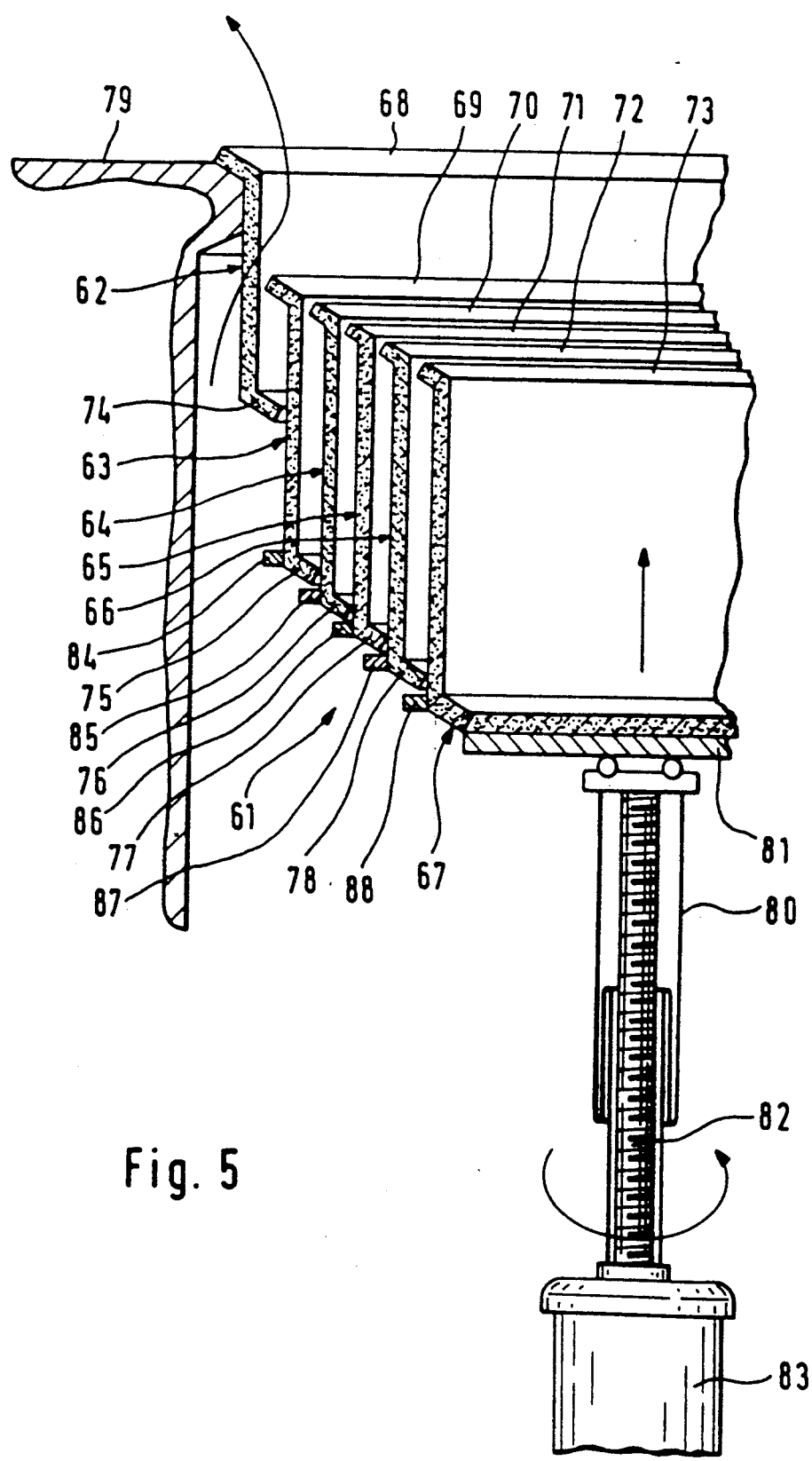
FIG. 5 is a filter candle with slanting flanges.

A filter candle 61 is partly shown in FIG. 5 and consists of a total of six filter-candle segments 62, 63, 64, 65, 66, 67 which can telescope on one another and are made of a porous filter material. The filter-candle segments 62 through 67 each are cylindrical and comprise external flanges 68, 69, 70, 71, 72, 73 at their upper rims and extending over the entire periphery and slanting upward. The external flanges 69, 70, 71, 72, 73 match resp. inner flanges 74, 75, 76, 77, 78 projecting each from the lower ends of the filter-candle segments 62, 63, 63, 65, 66 and pointing obliquely downward. Their conical angle matches that of the external flanges 69, 70, 71, 72, 73, so that in the telescoped-apart state surface contact is made between said external flanges and the inner flanges 74, 75, 76, 77, 78.

The upper filter-candle segment 62 is suspended from an aperture in a housing 69 of a filter not when in further detail herein. For that purpose the upper filter-candle segment 62 rests by means of the external flange 68 on a correspondingly conically shaped support surface of the aperture. All filter-candle segments 62 through 67 are crossed by gas from the outside to the inside in the manner already described in the embodiment of FIG. 1.

A plunger 80 is present underneath the filter candle 61 and rests by an end plate 81 against the lower filter-candle segment 67. A spindle 82 driven by an electric motor 83 passes through the plunger 80. The displacement plunger 80 can be moved up and down by rotating the spindle 82.

In the state shown, the plunger 80 is partly advanced upward, so that the filter-candle segments 63, 64, 65, 66, 67 already have been telescoped together. External drive rings, 84, 85, 86, 87, 88 are provided so these segments can displace each other along and provide supports for the particular upper filter-candle segment 62, 63, 64, 65, 66 when being telescoped together. However, instead of the drive rings, 84, 85, 86, 87, 88, a suitably wide end plate 81 may be used on which the filter-candle segments 62, 63, 64, 65, 66, 67 sequentially will be received when the plunger 80 is being raised.

We claim:

1. Filter candle, especially for gas equipment, comprising:
   a plurality of cooperatively associated tubular mutually telescopically engaging filter-candle segments, each segment comprised of an inherently dimensionally stable material and each segment including means for supporting each segment relative to the other segment and including means for limiting the movement thereof relative to the other associated segment and means for releasably supporting said segments together as a filter candle.

2. Filter candle as defined in claim 1, wherein the filter-candle segments when telescoped apart rest against each other by means of sealing rings.

3. Filter candle as defined in claim 1, wherein the filter-candle is associated with a displacement means of which a plunger can be moved against a bottom of the lowermost filter-candle segment and can be moved upward.

4. Filter candle as defined in claim 1, wherein the filter-candle segments mutually brace each other in geometrically locking manner.

5. Filter candle as defined in claim 4, wherein the brace takes place over the entire circumference of each segment.

6. Filter candle as defined in claim 1, wherein the filter-candle segments comprise mutually bracing projections.

7. Filter candle as defined in claim 4, wherein the filter-candle segments are conical and are arranged in such manner that the lower diameter of the particular outer filter-candle segment is less than the upper diameter of the particular adjacent inner filter-candle segment.

8. Filter candle defined in claim 4, wherein the lower most filter-candle as segment is loaded with an addition weight.

9. Filter candle as defined in claim 6, wherein the projections are flanges at the top and bottom of each segment which project inward at the bottom and outward at the top.

10. Filter candle as defined in claim 9, wherein the flanges are U-shaped.

11. Filter candle as defined in claim 9, wherein the flanges are horizontal.

12. Filter candle as defined in claim 9, wherein the bottom flanges slant downward and the top flanges slant upward.

13. Filter candle as defined in claim 9, wherein the bottom flanges are gutter-shaped and the top flanges are bead-shaped.

14. Filter candle as defined in claim 1, wherein a means is affixed inside the filter-candle segment having a least cross-section and projects beyond the filter-candle segment having a largest cross-section.

15. Filter candle as defined in claim 14, wherein the means is a cable.

16. Filter candle as defined in claim 14, wherein the means is a rod.

17. Filter candle as defined in claim 16, wherein the rod is connected by a spring to the least cross-section filter-candle segment.

18. Filter candle as defined in claim 14, wherein the mutually telescoping filter-candle segments comprise external projections.

19. Filter candle, comprising:
   a) at least first and second tubular dimensionally stable hollow segments, each segment having opposite first and second ends and said segments being telescopically engageable one to another between first and second orientations;
   b) means operably associated with said segments for supporting each segment relative to another segment and including means for releasably supporting the second end of said first segment to the first end of said second segment as a filter-candle and for limiting the movement of said segments; and
   c) means closing the second end of said second segment so that said segments are telescoped and form an elongated tubular body which is open at one end and closed at the opposite end.

20. The filter candle of claim 19, wherein:
   a) said seal supporting means of each of said tubular includes a radially extending member.

21. The filter candle of claim 20, wherein:
   a) said first tubular segment end member extends radially inwardly, and said second tubular segment first end member extend radially outwardly.

22. The filter candle of claim 21, wherein:
   a) each of said members is a flange.

23. The filter candle of claim 22, wherein:
a) each of said flanges is U-shaped, and the flange of said first tubular segment interfits with the flange of said second tubular segment.

24. The filter candle of claim 21, wherein:
a) a sealing ring is mounted about said second tubular segment and is interposed between said members.

25. The filter candle of claim 22, wherein:
one of said flanges is gutter-shaped and the other of said flanges is bead-shaped and interfits with said gutter-shaped flange.

26. The filter candle of claim 19, wherein:
a) each of said tubular segments is cylindrical.

27. The filter candle of claim 19, wherein:
a) said second tubular segment has a diameter less than the diameter of said first tubular segment, and said second segment telescopes within said first tubular segment.

28. The filter candle of claim 19, wherein:
a) each of said tubular segments is frustoconical.

29. The filter candle of claim 27, wherein:
a) said first tubular segment second end has an internal diameter less than the external diameter of said second tubular segment so that said second tubular segment telescopes within said first tubular segment.

30. The filter candle of claim 19, wherein:
a) means are operatively associated with said second tubular segment for moving said second tubular segment relative to said first segment.

31. The filter candle of claim 30, wherein:
a) said moving means is one of a cable and a rotary rod means.

32. The filter candle of claim 30, wherein:
a) said moving means extends within said tubular segments.

33. The filter candle of claim 30, wherein:
a) said moving means is disposed exteriorly relative to said tubular segments.

34. The filter candle of claim 33, wherein:
a) said moving means includes a longitudinally movable plunger operably associated with said second tubular segment for causing moving thereof.

35. The filter candle of claim 19, wherein:
a) each of said tubular segments is comprised of a material selected from the group consisting of porous ceramics and porous organic sintered polymers.

36. The filter candle of claim 35, wherein:
a) said material is selected from the group consisting of polyethylene, polytetrafluoroethylene, polysulfones, and SiC.

37. A filter assembly, comprising:
a) a apertured support;
b) a first dimensionally stable tubular open ended segment, said first tubular segment being disposed within the aperture of said support and having a first end portion disposed about the aperture for maintaining said first tubular segment in position and an opposite second end portion extending therefrom; and,
c) a second dimensionally stable tubular segment, said second tubular segment has a first opened end portion releasably engaging said first tubular segment second end portion for supporting said first tubular segment relative to said second tubular segment and for limiting movement of said tubular segments relative to each other and an opposite second end portion closing said second tubular segment and said second tubular segment is telescopically engaging said first tubular segment for engaging and supporting said end portions and said segments as a filter candle.

* * * * *